United States Patent Office 3,395,004
Patented July 30, 1968

3,395,004
LOW-TEMPERATURE, HIGH-PRESSURE, CATALYTIC, PARTIAL CONVERSION OF NAPHTHA HYDROCARBONS TO HYDROGEN
William F. Taylor, Scotch Plains, Francis S. Pramuk, Fanwood, and Barry N. Heimlich, Union, N.J., assignors to Esso Research and Engineering Company, a corporation of Delaware
No Drawing. Filed Jan. 20, 1964, Ser. No. 338,585
6 Claims. (Cl. 48—214)

ABSTRACT OF THE DISCLOSURE

A hydrogen-rich gas product (above 50 mole percent $H_2$) is produced by reacting paraffinic naphtha hydrocarbons with steam at 550° to 900° F. under a pressure of 150 to 1500 p.s.i.g. in the presence of a catalyst containing nickel interspersed with silica or alumina, the interspersed nickel having a surface area of 20 to 60 $m.^2/g.$, the reaction being controlled for partial conversion of the hydrocarbons in the range of 5 to 40%.

---

This invention relates to a process for producing hydrogen from normally liquid hydrocarbons by reaction with steam in the presence of a catalyst at relatively low reaction temperatures, high pressures, and high space velocities which are controlled for prolonging the activity of the catalyst in obtaining a partial conversion of the hydrocarbons.

The reaction of normally gaseous hydrocarbons, e.g., methane to butane, with steam in the presence of a catalyst at temperatures above 932° F. (500° C.) to form $H_2$ with CO or with $CO_2$ as principal products is known. It is known that such a reaction goes to completion at above 1000° F., i.e., at temperatures above the metallurgical limits for usual piping. Although there have been suggestions that such a reaction be carried out under high pressures, there are difficulties in supplying the normally gaseous hydrocarbons under elevated pressures and difficulties of using apparatus at such high temperatures and pressures. Production of high pressure hydrogen is desirable for a low B.t.u. Town Gas, or for use in various hydrogenation, hydrogenolysis or hydrocracking processes and in ammonia synthesis.

In accordance with the present invention, high pressure hydrogen production is obtained at reaction temperatures in the range of 550° F. to 900° F. and mainly below 800° F. with a fresh active catalyst in a very fast reaction of normally liquid hydrocarbons easily pumped to the desired reaction pressures, e.g., 5 to 100 atmospheres. The present invention is based on a discovery that suitably active catalysts can make the normally liquid hydrocarbons, particularly those which are $C_5$ to $C_{10}$ paraffins, form mainly $H_2$ and $CO_2$ gas products if the residence period is short enough to limit the formation of methane ($CH_4$) with a limited conversion of the feed hydrocarbons.

There are many possible reactions of mixtures containing hydrocarbons, $H_2O$, $H_2$, $CO_2$ and CO, and the present invention is based on the discovery that by using a catalyst which makes the reaction of a normally liquid hydrocarbon, e.g., n-hexane, take place quickly at sufficiently low temperatures in producing mainly $H_2$, other undesired reactions such as cracking and carbon formation are minimized. Although this kind of operation involves a low or partial conversion of the normally liquid hydrocarbons, the unreacted normally liquid hydrocarbons can be separated from the gaseous products without substantial lowering of pressure and with economical lowering of temperature, and then can be fed back for reaction.

Another advantage of the low-temperature partial-conversion process is that it permits the use of highly active catalysts which almost at the instant of contact of the feed form principally $H_2$ and very little normally gaseous hydrocarbons, e.g. methane, ethane, propane, and butane. Also, in using a low reaction temperature with low conversion, the catalyst life is prolonged.

Highly active catalysts useful for the low temperature partial-conversion of the naphtha hydrocarbons to obtain principally hydrogen are typified by mixed nickel-alumina and nickel-silica catalysts (containing 40 to 60 wt. percent of Ni with 60 to 40 wt. percent of $Al_2O_3$ or $SiO_2$) which have high total surface areas in the range of 100 to 300 square meters per gram, ($m.^2/g.$) and nickel surface areas of 20 to 60 $m.^2/g.$ and these mixed catalysts may be promoted by certain metals, e.g., Ba, Sr, Cs, Ce, La, Y, Fe, K, and Ca, present as oxides, carbonates, or both oxides and carbonates. The proportion of promoter may be expressed 0.001 to 1 gram atoms of the promoter metal per gram atom of Ni.

For obtaining highest $H_2$-containing gas products, or highest $H_2/CH_4$ ratios, with high activity catalysts, the space velocity should be high. The space velocity varies as a function of both the reaction temperature and pressure to obtain the highest $H_2/CH_4$ ratio as brought out in the following examples.

Since highly active catalysts per se and methods for making them are regarded as known in the prior art as exemplified in U.S. S.N. 317,799, now U.S. Patent 3,320,-182, issued May 16, 1967, details on all such catalysts are not set forth, but general characterizations and representative examples are given. In general, the highly active nickel catalysts have the high nickel surface areas mentioned, i.e., above 20 $m.^2/g.$ They are obtained by coprecipitation of nickel with aluminum as hydroxides, carbonates, or basic carbonates from aqueous solutions of nitrate salts by $NH_4HCO_3$, low-temperature (200° to 400° F.) drying of the precipitates, low temperature (400° to 750° F.) calcining of the dried precipitates in air, and low-temperature (600° to 750° F.) activation of the calcined precipitates by hydrogen. The promoters are admixed as decompossible compounds, e.g. hydroxides, carbonates, or nitrates with the precipitates, similarly mixed catalysts of nickel with silica may be prepared using a meta silicate and kieselguhr, in place of aluminum compounds to have the nickel interspersed with $SiO_2$ instead of $Al_2O_3$. The catalyst granules may be 1 to 5 mm. particles or compressed larger pellets made from such particles.

The naphtha hydrocarbons used as feed are preheated and mixed with excess steam to form the reaction mixture at the desirbed temperature. Generally, a ratio of 1.5 to 3 lbs. steam per 1 lb. hydrocarbon is used.

From analyses of products, proportions of reactants, and other considerations, the partial conversion yielding high amounts of hydrogen may be regarded as involving the following over-all principal reaction paths, assuming that n-hexane is typical of the average initial normally liquid hydrocarbon reactant:

(1) $C_6H_{14} + 9.6H_2O \rightarrow 13H_2 + 6CO + 3.6H_2O$
(2) $CO + H_2O \rightleftharpoons CO_2 + H_2$
(3) $CO + 3H_2 \rightleftharpoons CH_4 + H_2O$ Reaction 1 implies that the hydrocarbon initially decomposes in the presence of steam to liberate hydrogen and form an oxide of carbon, presumedly carbon monoxide. Following this, the carbon monoxide reactions with water to form carbon dioxide and more hydrogen in the so-called Water Gas Shift, or Reaction 2, takes place. The carbon monoxide may also react with hydrogen to form methane and water, in the so-called Methanation Reaction (Reaction 3). The thermodynamic equilibrium for Reactions 2 and 3 are known to control the product composition at complete hydrocarbon feed conversion. However, Reaction 2 is very rapid relative to Reaction 1 since the product contains very little carbon monoxide at low conversion levels. Reaction 3 is slow relative to Reactions 1 and 2. This forms the theoretical basis for this invention since it allows a hydrogen-rich product to be formed at process conditions, where in terms of equilibrium alone, a hydrogen poor product would be expected, i.e., at high pressure and low temperature. This invention, moreover, is based on the unexpected result that a hydrogen-rich product is obtained at low conversion levels, and is not contingent on the validity of the reaction paths proposed. Reaction 1 is endothermic, and Reaction 2 slightly exothermic. Reaction 3 is strongly exothermic and tends to increase the temperature in the reaction zone.

EXAMPLE

A high activity nickel catalyst containing 60 wt. percent Ni mixed with $SiO_2$ (kieselguhr) was used as the catalyst in a steel reactor. This catalyst, freshly prepared, has a nickel surface area as high as 54 m.$^2$/g. A light naphtha feed of 95% n-hexane was passed with 2 lbs. steam per lb. of hydrocarbon feed at controlled low temperatures into contact with the catalyst at controlled space velocities and under controlled pressures. The effluent gaseous products were analyzed. Results are tabulated as follows:

TABLE I

| Run | 1 | 2 | 3 | 4 | 5 | 6 |
|---|---|---|---|---|---|---|
| Temperature, °F | 600 | 700 | 800 | 900 | 700 | 600 |
| Pressure, p.s.i.g | 350 | 350 | 350 | 500 | 150 | 1,000 |
| Space Velocity, w./hr./w | 94 | 94 | 5.6 | 17 | 25 | 63 |
| Percent Hexane Conversion | 5 | 10 | 45 | 19 | 12 | 6 |
| Dry Gas Product Composition (mole percent): | | | | | | |
| $H_2$ | 72.8 | 54.1 | 28.7 | 50.5 | 61.7 | 59.7 |
| $CH_4$ | 7.7 | 23.8 | 48.5 | 26.2 | 13.8 | 17.5 |
| CO | 1.1 | 0.3 | 0.8 | 0.5 | 2.3 | 2.2 |
| $CO_2$ | 18.4 | 21.8 | 22.0 | 21.8 | 22.2 | 20.6 |
| B.t.u./ft.$^3$ with $CO_2$ | 310 | 420 | 580 | 430 | 340 | 400 |
| B.t.u./ft.$^3$ without $CO_2$ | 380 | 530 | 740 | 540 | 390 | 528 |

The representative data in the table shows that very high space velocities (94 lbs. of hydrocarbon feed per hour per lb. of catalyst) can be used effectively at temperatures well below 900° F. to produce $H_2$ as the main conversion product and thus attain the objects of the invention, i.e., particularly selective high yields of $H_2$ at high pressure and low temperature.

The experimental data demonstrated that the conversion to $H_2$ (Reaction 1) and reaction of CO to form $CO_2$ (Reaction 2) were very rapid so that the reaction of CO with $H_2$ to form $CH_4$ was suppressed.

A comparison of Run 3 with Run 4 shows the need of increasing the space velocity and lowering the conversion to obtain the $H_2$-rich gas product.

Although the partial conversion to obtain principally $H_2$ is desired for industrial use of the $H_2$, the low B.t.u. product may be used as a fuel gas in areas where a low 300 to 700 B.t.u./s.c.f. Town Gas is desired with the advantages of low reaction temperatures and high pressures.

Additional experiments have shown that as the reaction temperature is increased, the pressure should be increased to lower carbon deposition and that as the reaction temperature is increased the catalyst becomes deactivated more rapidly by thermal and oxidative sintering. Accordingly, for the catalyst to be used economically it should be capable of lasting over 500 hours and this is best obtained at temperatures in the range of 550° F. to 800° F. and pressures of 150 to 1500 p.s.i.g., and space velocities of 20 to 100 w./hr./w. or a contact time of about 36 to 180 seconds. As the catalyst becomes deactivated, with loss of surface area, the reaction temperature can be stepped up e.g., about 5° per 50 hours, and an adequate reaction rate is maintained as the temperature approaches 900° F.

The high space velocity or short residence period simplifies the control of temperature in the reaction zone. The reaction products are at a low temperature like that of the feed, which means economy of heating and product separation, in removal of unreacted condensible hydrocarbon reactants, water vapor and of $CO_2$ by condensation, adsorption, or absorption.

If the $CH_4$ content of the gas product is too high, methods can be used for removal of the methane such as oxidation. For uses such as hydrogen for hydrogenolysis or hydrocracking, some methane can be tolerated in the hydrogen feed gas.

In cooling the gaseous products, conventional heat exchange means can be used for transferring the heat for preheating water and/or feed hydrocarbons.

In the operation of the partial conversion process under the suitable pressures, the gaseous effluent from the catalytic reaction zone has a low temperature similar to the inlet temperature and may even be lower, e.g., in the range of 550° to 800° F. with 5 to 40% conversion of light naphtha hydrocarbons which are mainly $C_5$ to $C_{10}$ paraffins to obtain a gas product of above 50 mole percent $H_2$, with less $CO_2$ and $CH_4$, and a slight amount of CO and of other normally gaseous hydrocarbons on a dry basis in addition to $H_2O$ vapor and unconverted naphtha hydrocarbons.

The light naphtha feed is preferably low in sulfur, e.g., below 3 p.p.m. to minimize the poisoning effect by sulfur-containing compounds.

The partial conversion for obtaining a gas product of high $H_2/CH_4$ ratio differs from the conversion for obtaining a high heating value fuel gas of high $CH_4/H_2$ ratio in several significant ways. The partial conversion for high $H/CH_4$ ratio is preferably at less than 40% conversion of the naphtha hydrocarbons, which can occur at lower reaction temperatures, e.g., below 700° F., with a relatively small temperature variation from inlet to outlet of the catalyst bed, e.g., a drop of less than 40° F. In producing methane-rich fuel gas, the conversion is preferably above 90%, the reaction temperatures are mainly above 700° F., and the temperature variation from inlet to outlet of the bed tends to rise more than 100° F. due to the exothermic methanation reaction.

For the low temperature partial-conversion of the naphtha hydrocarbons, to produce principally hydrogen, there are substantial differences in the activities of the catalysts of the class called high activity catalysts. The nickel-$SiO_2$ or Ni-kieselguhr catalyst described in the example is far surpassed in activity for the dehydrogenation/oxidation decomposition reaction by Ni-$Al_2O_3$ catalysts prepared by the coprecipitation technique with added promoters as shown in the following Table II:

TABLE II

Principal reaction: $C_6H_{14} + 9.6H_2O \rightarrow 13H_2 + 6CO + 3.6H_2O$

| Catalyst: | Relative rates of hexane decomposition |
|---|---|
| Ni-kieselguhr | 1 |
| Ni-$Al_2O_3$-K | 1.8 |
| Ni-$Al_2O_3$-3% Ba | 2.5 |
| Ni-$Al_2O_3$-6% Ba | 3.5+ |

The relative hexane decomposition rates can be obtained by determining the percent conversion of hexane with the various catalysts under comparative reaction conditions of temperature, space velocity, and pressure using the same kind of feed.

In an economical use of the process of partial conversion the feed of naphtha hydrocarbon mixed with steam are contacted with the catalyst in the reaction zone during a long run, mainly at temperatures in the range of 550° to 800° F. with the catalyst maintained at high activity and the gaseous reaction product of mostly $H_2$ with lesser amounts of $CO_2$, $CH_4$, and CO is withdrawn with unreacted naphtha hydrocarbons and steam from the reaction zone to a high pressure condensation zone for separation of the naphtha hydrocarbons as liquid and condensation of the steam.

The gaseous products with steam and vapors of unreacted naphtha hydrocarbons can be made to transfer a substantial amount of heat by heat exchange to water and naphtha feed, then be cooled further for condensing out the steam and vapors of naphtha hydrocarbons. The gaseous product after sufficient cooling under pressure can be subjected to absorption treatments for removing $CO_2$, CO, and $CH_4$ in order to obtain a purified high pressure hydrogen gas. Absorbing liquids such as aqueous solutions of alkali carbonates, ethanolamines, glycols, and the like absorb $CO_2$ and moisture. Solid adsorbents such as calcium oxide and silica gel may be used. Organic solvents, e.g., liquid hydrocarbons, which absorb gaseous hydrocarbon can be used for removing methane. Solid absorbents, e.g., adsorptive carbon may be used.

The invention described is claimed as follows:

1. Process for producing a gas containing principally $H_2$ with $CO_2$, $CH_4$, and CO which comprises passing a naphtha hydrocarbon feed of principally $C_5$ to $C_{10}$ paraffin hydrocarbons with steam into contact with a catalyst containing 40 to 60 wt. percent nickel interspersed with a compound selected from the group consisting of alumina and silica and having initially a nickel surface area of above 20 to 60 square meters per gram and having a total surface area of 100 to 300 m.$^2$/g. at 550° to 900° F., under a pressure of 150 to 1500 p.s.i.g., at a space velocity sufficient to convert 5 to 40% of the hydrocarbon feed to a gas product containing $H_2$, $CO_2$, $CH_4$, and CO of which $H_2$ is above 50 mole percent proportion, and recovering said gas product.

2. Process of claim 1, in which the catalyst contains the 40 to 60 wt. percent Ni with silica.

3. Process of claim 1, in which the catalyst contains 40 to 60 wt. percent Ni interspersed with 60 to 40 wt. percent $Al_2O_3$ and a promoting metal of the group consisting of Ba, Sr, Cs, La, Ce, Y, Fe, K and Ca.

4. Process of claim 1, in which the hydrocarbon feed is contacted with the catalyst at a space velocity of 20 to 100 lbs. hydrocarbon feed per hour per lb. of the catalyst.

5. Process of claim 1, in which the gas product is recovered by condensing out unreacted liquid naphtha hydrocarbons under pressure.

6. Process of claim 1, in which the naphtha hydrocarbon feed mixed with steam is contacted with the catalyst of high activity mainly at temperatures in the range of 550° to 800° F. in maintaining the catalyst at high activity and the gaseous reaction product is removed with unreacted naphtha hydrocarbons from contact with the catalyst at a temperature in the range of 550° to 800° F. for recovery of the unreacted naphtha hydrocarbons from the gaseous reaction product.

References Cited

UNITED STATES PATENTS

| | | | |
|---|---|---|---|
| 3,106,457 | 10/1963 | Lockerbie et al. | 23—212 |
| 3,119,667 | 1/1964 | McMahon. | |
| 3,162,606 | 12/1964 | Geraitis et al. | 252—459 X |
| 3,201,214 | 8/1965 | Fox et al. | 48—214 |
| 3,271,325 | 9/1966 | Davies et al. | 48—214 X |

JOSEPH SCOVRONEK, *Primary Examiner.*